United States Patent Office 3,284,877
Patented Nov. 15, 1966

3,284,877
**METHOD OF MANUFACTURING THERMO-
ELECTRIC MODULES**
Hans J. Naake, Louisville, Ky., assignor to General Electric Company, a corporation of New York
Filed Oct. 7, 1964, Ser. No. 402,123
3 Claims. (Cl. 29—155.5)

The present invention relates to thermoelectric devices and is more particularly concerned with an improved method for manufacturing thermoelectric modules for use in such devices.

Thermoelectric devices for heating and cooling applications comprise modules composed of pairs of dissimilar thermoelectric elements, that is p-type and n-type elements, alternately and serially connected so that when a direct current is passed through the series-connected elements there is produced a set of cold junctions and a set of hot junctions. The best materials presently known for manufacture of the elements are bismuth telluride and its alloys with bismuth selenide and antimony telluride. These materials have highly anisotropic thermal and electrical properties. For maximum development of the anisotropic properties, the elements are produced in the form of relatively long rods by a directional freezing method known generally as the Bridgman method. By this method, the molten material is solidified slowly and progressively from one end to the other while the temperature gradient at the liquid-solid interface is in the longitudinal direction of the melt. The resultant product is a highly oriented ingot with cleavage planes parallel to the longitudinal direction of the rods. To produce the individual thermoelectric elements, the rods have been cut into short pieces of a size and shape suitable for use in making couples of modules in which the current flows parallel to the cleavage planes. The thermoelectric figure of merit, which is the combination of a plurality of thermal and electrical properties, is at a maximum in the direction parallel to the cleavage planes.

The production of long rods by the Bridgman technique is in general a time consuming process primarily because the speed of solidification has to be relatively slow in order to obtain good crystal orientation. To avoid this disadvantage attempts have been made to design Bridgman type furnaces in which a plurality of melts can be solidified simultaneously or in which ingots having relatively large cross-sectional dimensions are produced, which ingots are subsequently sliced into pieces having smaller cross-sections. Both methods require the use of quartz or Vycor ampoules as melt containers and these in general cannot be reused. Furthermore a large number of precision slicing operations are required to produce small pieces or elements having the required dimensions and this is a time consuming and difficult operation due to the fragility of bismuth telluride materials.

An object of the present invention is to provide an individual casting method by means of which pieces of thermoelectric material, that is themoelectric elements are directly produced in final module size.

A further object of the invention is to provide a method of producing a plurality of individual thermoelectric elements of the required final size by a casting technique in which the crystallites within the elements are oriented for optimum electrical properties.

A more specific object of the invention is to provide a method of casting individual thermoelectric elements which includes the joining of junction forming means to the elements as part of the process.

Further objects and advantages of the invention will become apparent as the following description proceeds and the features of novelty which characterize the invention will be pointed out with particularity in the claims annexed to and forming a part of this specification.

For a better understanding of the invention reference may be had to the accompanying drawing in which.

Figure 1:
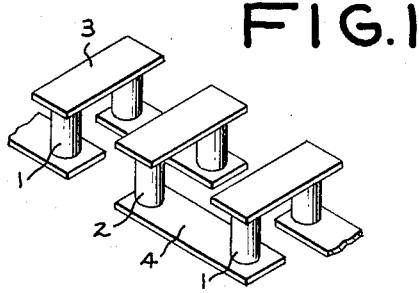
FIGURE 1 is a perspective view of a portion of a thermoelectric module.

With reference to FIGURE 1 of the drawing, there is illustrated a portion of a thermoelectric module comprising p-type elements 1 and n-type elements 2 alternatively and series-connected by junction forming means 3 and 4, such as copper strips, respectively forming the hot and cold junctions when a direct current is passed through the interconnected elements.

In accordance with the present invention a module of this type and particularly the elements 1 and 2 are prepared by a casting technique in which a plurality of the elements are produced simultaneously by a process designed to produce elements of the required final size and shape and possessing optimum thermal and electrical properties.

Figure 2:
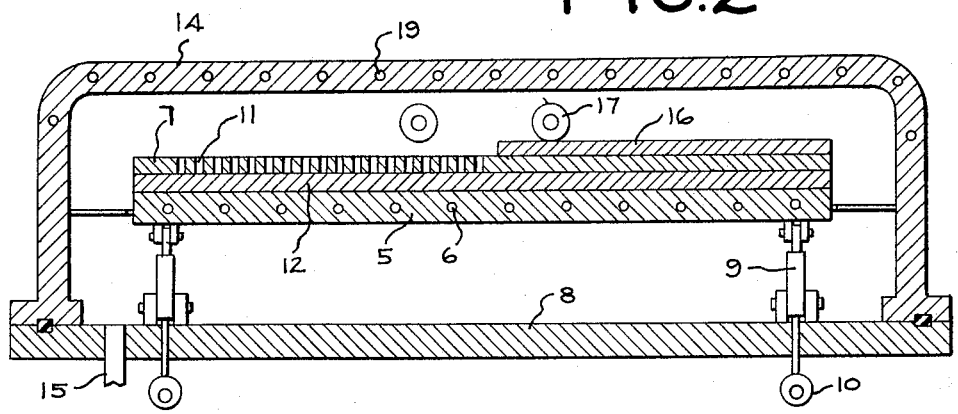
FIGURE 2 is a schematic illustration of casting apparatus suitable for the practice of the present invention.
Figure 3:
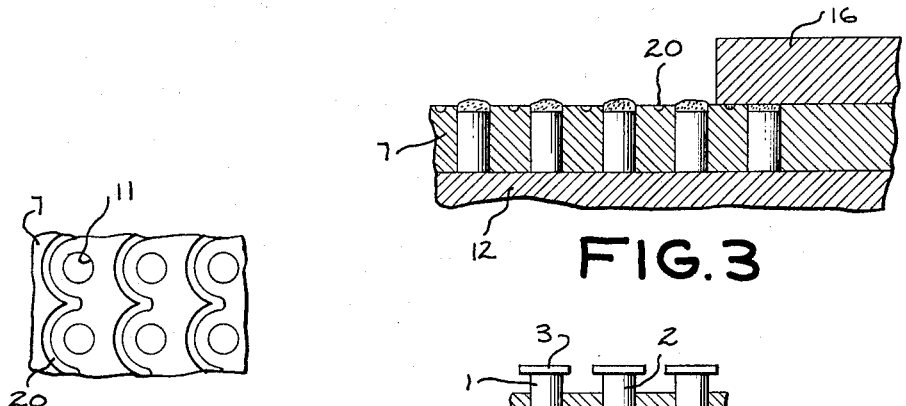
FIGURE 3 is a detailed sectional view of a portion of the apparatus illustrated in FIGURE 2.
Figure 4:
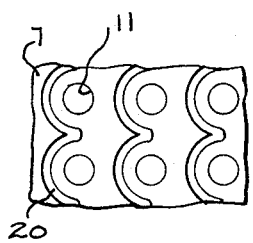
FIGURE 4 is a plan view of a portion of the casting apparatus of FIGURE 2.

Suitable apparatus for carrying out the method of the present invention is schematically illustrated in FIGURE 2 of the drawing as comprising a form plate 7 of a thickness which determines the length of the individual elements. This plate includes a plurality of holes or cavities 11 extending between the upper and lower faces of the plate and these holes may have circular, square or rectangular cross-sections depending upon the desired cross-sections of the individual thermoelectric elements. For the manufacture of the elements, the form plate 1 is supported upon a platen 12 so that the platen 12 forms the bottom wall of each of the mold cavities 11 in which the individual elements are cast. The platen 12 is in turn supported upon a heating plate 5 including electrical heating means 6 and the plate 5 is supported on a base 8 by resilient support means 9 including vibrating means including an eccentric 10 for vibrating the form plate 7 during certain portions of the process.

A removable cover or vaporization shield 14 adapted to rest on the base 8 forms an enclosure for the form plate 7 and associated components of the apparatus whereby the casting of the thermoelectric material can be carried out in an inert environment or atmosphere such as under a vacuum or in a noble gas or nitrogen atmosphere. A conduit 15 provides means for providing the desired vacuum or for supplying the desired gaseous inert atmosphere.

The apparatus also includes a sliding plate 16 adapted to rest on one portion of the form plate 7 in a position such that by means of rollers 17 it can be slid over the portion of the plate 1 including the holes 11 for removing excess thermoelectric material from the mold cavities defined by the holes 11 during the latter portion of the casting process.

The platen 4, the form plate 7 and the sliding plate 16 are composed of materials adapted to withstand the melting temperatures of the thermoelectric material and to be inert insofar as any influence thereof on the thermoelectric properties of the material is concerned. Also the material should not adhere to the surface of the solidified elements. To these ends, these components are preferably made of graphite, graphite-coated quartz or boron carbide.

Employing the apparatus of FIGURE 2 in the practice of the present invention, the form plate 7 is placed on the platen 12 and the cavities 11 defined by the holes 11 in the form plate are filled with coarsely ground powder of the desired thermoelectric material or materials. All of the holes may, if desired, be filled with either a p-type or an n-type powder although in accordance with a preferred aspect of the present invention, every other hole is filled with one type of powder and the remaining holes with the other type. The amount of powder in each hole should be sufficient to completely fill the hole when the material is in the molten state and also provide for a cap extending above the top surface of the form plate 7, which cap is of a size such that it will be held in position by the surface tension of the molten material. When some of the holes are filled with p-type material and others with n-type, the pattern of the holes respectively filled with p- and n-type materials should be such as to form the pattern of elements desired in the final thermoelectric module or modules.

After the holes have been filled with thermoelectric material, the cover 14 is placed in position on the base 8 and the space containing the form plate 1 filled with a suitable inert gas. Thereafter the form plate 7 is heated by energization of the electric heating means 6 provided in the plate 5 and heating means 19 provided on the cover 14. During the heating operation the inert atmosphere prevents oxidation of the material. As soon as the thermoelectric material contained in the various holes 11 has reached a molten state, the vibrating means 10 is energized in order to subject the form plate 1 sufficient vibration to remove any vapor bubbles from the molten material. The amplitude of vibration is adjusted to remove at least the larger bubbles without causing the molten material to splash from the holes. After the vibrations have been maintained for sufficient length of time, the vibrating means is de-energized and the molten thermoelectric material in the holes 11 subjected to a temperature gradient and a gradual cooling operation designed to provide the maximum thermoelectric properties in the final products.

More specifically, this step comprises subjecting the form plate and hence the material contained within the holes 11 to a temperature gradient in a direction such that the upper surface of the plate atains a higher temperature than the lower surface. This is done by increasing the power to the heating means 19 in the shield or cover 14 and reducing the power to the heating means 6 provided in the plate 5. Initially the power supplied to these respective heating means is controlled in such a way that the temperature of the lower surface of the form plate 7 is at a temperature somewhat higher, for example 10 to 20° C. higher, than the melting point of the highest melting type of material contained in the holes 2. The temperature of the upper surface of the form plate 7 is substantially higher. A vertical temperature gradient between the lower and upper surfaces of the form plate 1 of approximately 100° C./cm. is generally desirable.

Once the desired temperature gradient has been established, the temperatures of the base plate 4 and the cover or shield 14 are slowly and simultaneously lowered at a rate of about 100° C. per hour which will cause the isothermal planes and consequently the solid-liquid interfaces in the melts contained within the holes 11 to move upwardly at a speed of approximately 1 cm. per hour which has been found sufficiently slow to produce crystallization with preferential direction in the material.

The temperatures are reduced until the solid-liquid interfaces of the pieces being form in the holes have come within 0.5 to 1.0 millimeter of the upper surface of the form plate 7. At this point, the sliding plate 16 is moved slowly across the upper surface of the form plate in order to remove the excess material from each of the holes or cavities 11 and to provide a plane, square upper surface on each of the pieces. Preferably the upper surface of the form plate 7 is provided with suitable grooves 20 adjacent each hole for collecting the excess material removed from each of the holes so that it will not be transferred by the sliding plate 16 into any of the remaining holes. After the sliding plate has passed over all of the holes and covers that portion of the form plate including the holes 11, the power to the heaters 6 and 19 is turned off and the apparatus including form plate 7 allowed to cool to room temperature. The shield 14 is then removed.

Figure 5:
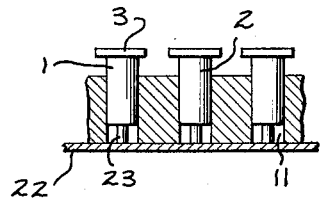
FIGURE 5 is a view illustrating one step in the practice of the present invention.

The pieces of thermoelectric material may be removed from the form plate using a fixture 22 illustrated in FIGURE 5 as including a plurality of matching protrusions 23 adapted to engage the ends of the individual thermoelectric elements. The individual elements may be completely removed if the form plate contains only pieces of one type of material or in accordance with the preferred aspect of the present invention, both n-type and p-type elements are simultaneously cast and the pieces are pressed only part way out of the hole as illustrated in FIGURE 5 after which junction forming means designed to provide either the hot or the cold junction as for example the junction forming means 3 are soldered to the exposed ends of adjacent elements 1 and 2 while they are supported in the form plate. By soldering a continuous plate of copper or the like to the exposed ends all of the elements can be joined to the plate and the assembly removed as a unit removed from the form plate. Thereafter, a second plate is soldered to the opposite ends of the unit and both plates are cut along suitable lines to form the series connection illustrated in FIGURE 1.

It will be seen that by the present method it is unnecessary to cut long rods of thermoelectric material into small pieces as has previously been required in the use of the Bridgman type method has been employed for the manufacture of thermoelectric materials. The method also makes it possible to produce the n-type and p-type pieces in a desired physical arrangement and permits soldering of the elements to the junction means to form modules while still supported in the form plate thereby eliminating the use of the jigs and the like comprising an extra step in the usual assembly procedure. It is necessary to handle the individual elements only after they have been soldered to junction means on one side, there is provided additional protection against the breakage of the fragile elements.

A particular advantage of the present method results from the fact that the lengths of the pieces as determined by the depth of the holes 11 are maintained to a higher degree of accuracy and the ends thereof are completely squared by means of the platen 12 and the sliding plate 16. No cutting, grinding or other operations are required for the manufacture of the final module.

While there has been shown and described a particular embodiment of the present invention it will be understood that it is not limited thereto and is intended by the appended claims to cover all such modifications as come within the true spirit and scope of the invention.

What I claim as new and desire to secure by Letters Patent of the United States is:

1. In the method of making cast thermoelectric elements directly suitable for use in the manufacture of thermoelectric modules which comprises the steps of:

providing a form plate of a thickness equal to the length of said elements and including a plurality of holes therein of the same cross-section of said elements and extending between the top and bottom faces of said plate, supporting said plate in a horizontal position on a platen adapted to close the bottom ends of said holes, introducing powdered thermoelectric material into the said holes in amounts such that when melted, said material will completely fill said holes and provide a cap of molten material extending a short distance above the top surface of each of said holes, enclosing said plate and platen in housing containing an inert atmosphere, supplying heat to both the top and bottom faces of said form plate to melt said powdered material, establishing a temperature gradient between the top and bottom faces of said form plate such that the top face is warmer than the bottom face, simultaneously lowering the temperatures of both faces while maintaining said gradient until solidification of said material progresses to a point spaced from but adjacent the top face of said form plate, removing excess molten material from each hole, cooling said form plate, and thereafter removing the solid elements from said holes.

2. The method of manufacturing thermoelectric modules including alternate p-type and n-type elements series connected by junction forming means which comprises the steps of:

providing a form plate of a thickness equal to the length of said elements and including a plurality of holes therein of the same cross-section of said elements and extending between the top and bottom faces of said plate, supporting said plate in a horizontal position on a platen with the bottom face of said plate in intimate contact with said platen, introducing powdered thermoelectric material into said holes in an amount such that when melted, said material will completely fill said holes and provide a cap of molten material extending a short distance above the top surface of each of said holes, enclosing said plate and platen in housing containing an inert atmosphere, supplying sufficient heat to said form plate to melt said powdered material, establishing a temperature gradient between the top and bottom faces of said form plate such that the top face is warmer than the bottom face, simultaneously lowering the temperatures of both faces while maintaining said gradient until solidification of said material progresses to a point spaced from but adjacent the top face of said form plate, sliding a skimming plate over the top face of said form plate to remove excess molten material from each hole and to square the upper surfaces of the elements, cooling said form plate, partially removing the solid elements from said holes, soldering junction forming means to the exposed ends, and thereafter removing the soldered assembly from said form plate.

3. The method of manufacturing a thermoelectric module including alternate p-type and n-type elements series connected by junction forming means which comprises the steps of:

providing a form plate of a thickness equal to the length of said elements and including a plurality of spaced holes therein of the same cross-section of said elements and extending between the top and bottom faces of said plate, supporting said plate in a horizontal position on a platen with the bottom face of said plate in intimate contact with said platen, selectively introducing powered p-type or n-type thermoelectric materials into said holes in a pattern corresponding to the arrangement of said elements in said module, enclosing said plate in a housing containing an inert atmosphere, supplying heat to both the top and bottom faces of said form plate to melt said powdered materials, vibrating said form plate to remove vapor bubbles from the melt, establishing a temperature gradient between the top and bottom faces of said form plate such that the top face is warmer than the bottom face, simultaneously lowering the temperatures of both faces while maintaining said gradient until solidification of said materials progresses to a point spaced from but adjacent the top face of said form plate, sliding a skimming plate over the top face of said form plate to remove excess molten material from each of said holes and to square the upper surfaces of the elements, cooling said form plate, partially ejecting the solid elements from said holes, soldering junction forming means to the exposed ends of said elements, and thereafter removing the soldered assemblies from said form plate.

References Cited by the Examiner
UNITED STATES PATENTS
3,234,609   2/1966   Madono _____ 22—212 X CHARLIE T. MOON, Primary Examiner.

WILLIAM I. BROOKS, Examiner.